United States Patent [19]

Kahl

[11] 4,387,528

[45] Jun. 14, 1983

[54] SELF SETTING FISH HOOK MEANS

[76] Inventor: Manfred E. Kahl, Northport, N.Y.

[21] Appl. No.: 281,568

[22] Filed: Jul. 9, 1981

Related U.S. Application Data

[63] Continuation-in-part of Ser. No. 134,108, Mar. 26, 1980, abandoned.

[51] Int. Cl.³ ............................................. A01K 83/02
[52] U.S. Cl. ...................................................... 43/36
[58] Field of Search .............................. 43/15, 34–37, 43/43.4

[56] References Cited

U.S. PATENT DOCUMENTS

| | | | |
|---|---|---|---|
| 1,156,795 | 10/1915 | Mau | 43/36 |
| 1,448,735 | 3/1923 | Edmondson | 43/36 |
| 2,491,546 | 12/1949 | Barnett et al. | 43/36 |
| 2,643,479 | 6/1953 | Stevenson | |
| 2,856,722 | 11/1958 | Byhre | 43/36 |
| 2,949,690 | 8/1960 | Clough | 43/37 |

FOREIGN PATENT DOCUMENTS

| | | | |
|---|---|---|---|
| 692647 | 8/1965 | Italy | 43/15 |
| 716422 | 10/1966 | Italy | 43/36 |

*Primary Examiner*—James G. Smith
*Assistant Examiner*—K. Bradford Adolphson
*Attorney, Agent, or Firm*—Kerkam, Stowell, Kondracki & Clarke

[57] ABSTRACT

Self setting fish hook assembly. A spring has first and second extending arms, the spring being arranged to force the arms apart. First and second barbed hooks are mounted on the first and second arms. A latch spring is mounted on the first arm, the latch spring has a first extending member with a shallow hook portion at its end and a second extending member longer than the first extending member. The hook portion is arranged to hold the second arm in compressed position and adapted to release the second arm when the first and second arms are compressed by a fish biting on them. The second extending portion is arranged to snap the hook portion away from the arm being held when the first and second arms are compressed.

3 Claims, 5 Drawing Figures

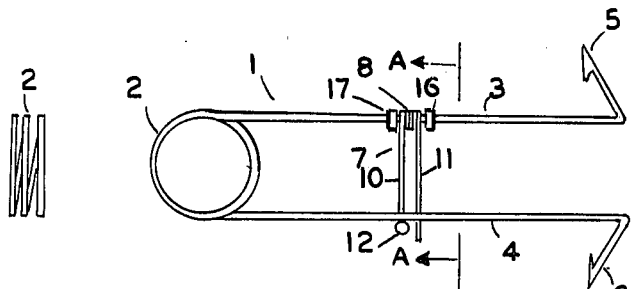 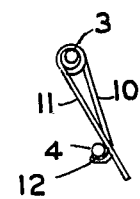
FIG 1A  FIG 1  FIG 1B
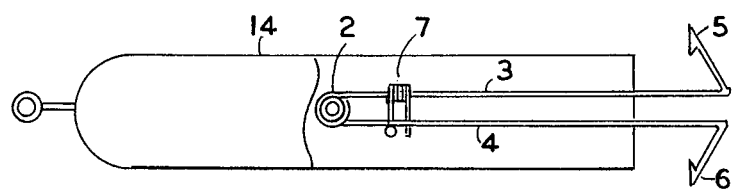
FIG 2
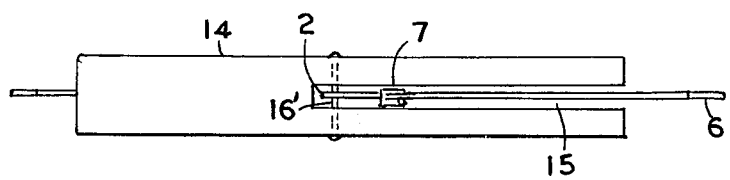
FIG 2A

SELF SETTING FISH HOOK MEANS

This Application is a continuation-in-part of my prior co-pending Application, Ser. No. 134,108, filed Mar. 26, 1980, for "SELF SETTING FISH HOOK" now abandoned.

TECHNICAL FIELD

This invention relates to self setting fish hooks and more particularly to a self setting fish hook assembly having two arms with hooks which are spring loaded and latched so that when the arms are compressed, the arms are released and spring apart.

BACKGROUND ART

Conventional fish hooks operate by the fish biting and the movement caused thereby being transmitted through the line and rod to the fisherman who then raises the rod to set the hook. This time lag and loss of motion due to the flexibility of the rod and the line and the slack in the line, often defeat the purpose of setting the hook. Self setting fish hooks are shown in U.S. Pat. Nos. 1,156,795; 2,491,546 and 2,856,722, and others. However, these devices are mechanically complicated and cumbersome, they operate differently from the present invention.

OBJECTS OF THE INVENTION

Accordingly, a principal object of the invention is to provide new and improved self setting fish hook means.

Another object of the invention is to provide a new and improved fishing lure with self setting fish hook means.

Another object of the invention is to provide new and improved self setting fish hook means comprising—a spring having first and second extending arms, the spring being arranged to force the arms apart, first and second barbed hooks on the first and second arms, a latch spring mounted on the first arm and retained by nylon washers, said latch spring having first extending member with a shallow hook portion at its end and a second extending member longer than the first extending member, the hook portion being arranged to hold the second arm in compressed position and adapted to release the second arm when the first and second arms are compressed by a fish biting on them, the second extending portion being arranged to snap the hook portion away from the arm being held when the first and second arms are compressed.

BRIEF DESCRIPTION OF THE DRAWINGS

These and other objects of the invention will be apparent from the following specification and drawings of which:

FIG. 1 is a side view of an embodiment of the invention.

FIG. 1A is one end view of FIG. 1.

FIG. 1B is the other end view of FIG. 1.

FIG. 2 is a top view, partially cut away, of a fishing lure embodying the invention.

FIG. 2A is a side view of FIG. 2.

BEST MODE OF THE INVENTION

Referring to FIGS. 1, 1A and 1B, the invention comprises a spring 1, having a coil portion 2 and a first and second extending arms, 3 and 4. The arm 3 has a barbed hook portion 5, and the arm 4, has a barbed hook portion 6.

In operating position, the arms 3 and 4, are held in compressed parallel position as shown in FIG. 1, by means of the latch 7. The latch 7 is a spring which has a coil portion 8, mounted on arm 3 and retained by nylon rings 16, 17, and a first and second extending arms 10 and 11. The arm 10 has a shallow hook portion 12. The arm 11 is longer than the arm 10 and extends down behind the arm 4, FIG. 1.

In operation, when the arms 3 and 4 are compressed by the fish biting on one or more of the hooks 5 and 6, the latch 7 will be released and the arm 11 will snap the hook portion 12 away from the arm 4, thereby allowing the arm-biasing coil spring 2 to spring the arms 3 and 4 and hooks 5 and 6 away from each other, thereby setting one or more of the hooks in the fish's mouth.

FIG. 2 shows a fish lure having a body member 14, with a large slot 15. The self setting hook arrangement of FIG. 1 is mounted in the slot 15 by means of the axle 16 so that the hook assembly is rotatable about the axle 16'. The hook assembly 2, 3, 4, 5, 6 and 7, is the same as described in connection with FIG. 1. The hook assembly extends out beyond the lure so that it will operate substantially as described in connection with FIG. 1 when the hooks are compressed by a fish biting on them.

It is claimed:

1. An invention comprising a fish hook including:
an arm-biasing spring and first and second extending arms, said arm-biasing spring biasing said first and second extending arms apart; first and second hooks respectively disposed on said first and second arms; a coil latch spring wrapped around said first extending arm, said coil latch spring having a first extending member with a hook portion at an end and a second extending member longer than said first extending member, said coil latch spring biasing said first and second extending members apart, said hook portion operative to hold said second extending arm compressed relatively close to said first extending arm, said hook portion adapted to release said second extending arm when a fish causes said first and second extending arms to move closer together, and said coil latch spring and said second extending portion are operative to snap said hook portion away from said second extending arm when a fish causes said first and second extending arms to move closer together such that said arm-biasing spring springs said first and second extending arms apart.

2. The invention of claim 1 wherein said arm-biasing spring is a coil spring.

3. The invention of claim 1 or 2 further comprising a fishing lure body member having a slot and wherein said fish hook is mounted in said slot and extends out beyond said fishing lure body member.

* * * * *